UNITED STATES PATENT OFFICE.

HENRY A. DANIELS, OF YONKERS, NEW YORK.

ARTIFICIAL STONE.

SPECIFICATION forming part of Letters Patent No. 346,729, dated August 3, 1886.

Application filed January 15, 1886. Serial No. 188,673. (No specimens.)

*To all whom it may concern:*

Be it known that I, HENRY A. DANIELS, a citizen of the United States, and a resident of Yonkers, in the county of Westchester and State of New York, have invented certain new and useful Improvements in Artificial Stone, of which the following is a specification.

My invention relates to the production of an artificial stone capable of being formed from a plastic material which acquires great hardness and solidity after it has become set and dried, and which will successfully resist the influence of varying temperatures and the effects of moisture, and which may be employed as a substitute for natural stone and marble.

In the preparation of my improved artificial stone I use a body material consisting of sand, or in some cases of other refractory finely-granulated substance — as crushed gravel, marble-dust, brick-dust, &c. — and cement, and with this I combine a binding material, which I have found in practice to impart great solidity, hardness, and toughness to the artificial composition. This binding material may be any suitable soft non-friable gum in solution, or a solution of mucilaginous substance — as, for instance, a solution of caoutchouc or glue. I prefer to use a solution of caoutchouc, and in some instances to use in connection therewith a solution of gum or glue. In some instances I combine with the above-named substances pearlash, muriate of soda, white or blue vitriol, or soluble glass, or either of them, and with either or all of said substances I also add, in some instances, a proportion of alum, and to the composition I add any suitable coloring-matter, according to the colors I desire to impart to the stone and the purpose for which it is to be employed. The cement used will also depend upon the purpose for which the stone is employed and the color required, Keene's cement being preferably used when the composition is to be of a light color, and Martin's cement, or Portland cement, or any other cement being substituted therefor when desired.

In the preparation of the stone I mix the body materials — as sand and cement — dry with the coloring material, and then I gradually add the solution, working the whole together until a paste-like mixture is made of proper consistency to be applied to any desired surface with a trowel, or to be cast or molded.

While I have referred to the use of pearlash and other materials named in connection with the body material and the binding material, I do not here claim the use of these ingredients, as the mixture embodying them constitutes the subjects of separate applications for Letters Patent, and I only name them in order to set forth some of the applications to which the improved composition may be put in the manufacture of artificial stone.

The ingredients specified may be used in different proportions; but I prefer to use sand and cement in suitable proportions — as, for instance, ten pounds of sand, five pounds of cement, and one-fourth of a pound of gum, glue, or caoutchouc to each gallon of liquid — the solution, as aforesaid, being added to the pulverized materials in sufficient quantities to make a paste of the stiffness desired. The solvent used will of course depend upon the character of the ingredient, water being used for dissolving glue, and naphtha or its equivalent for dissolving the gum.

Without limiting myself to the precise proportions set forth, I claim —

1. An artificial-stone composition consisting of sand, cement, and a solution of caoutchouc or non-friable binding material, substantially as set forth.

2. An artificial stone consisting of sand, cement, and a non-friable binding material — such as caoutchouc — combined substantially as set forth.

In testimony whereof I have signed my name to this specification in the presence of two subscribing witnesses.

HENRY A. DANIELS.

Witnesses:
HARRY M. DICKINSON,
H. P. STAMFORD.